Figure 1:
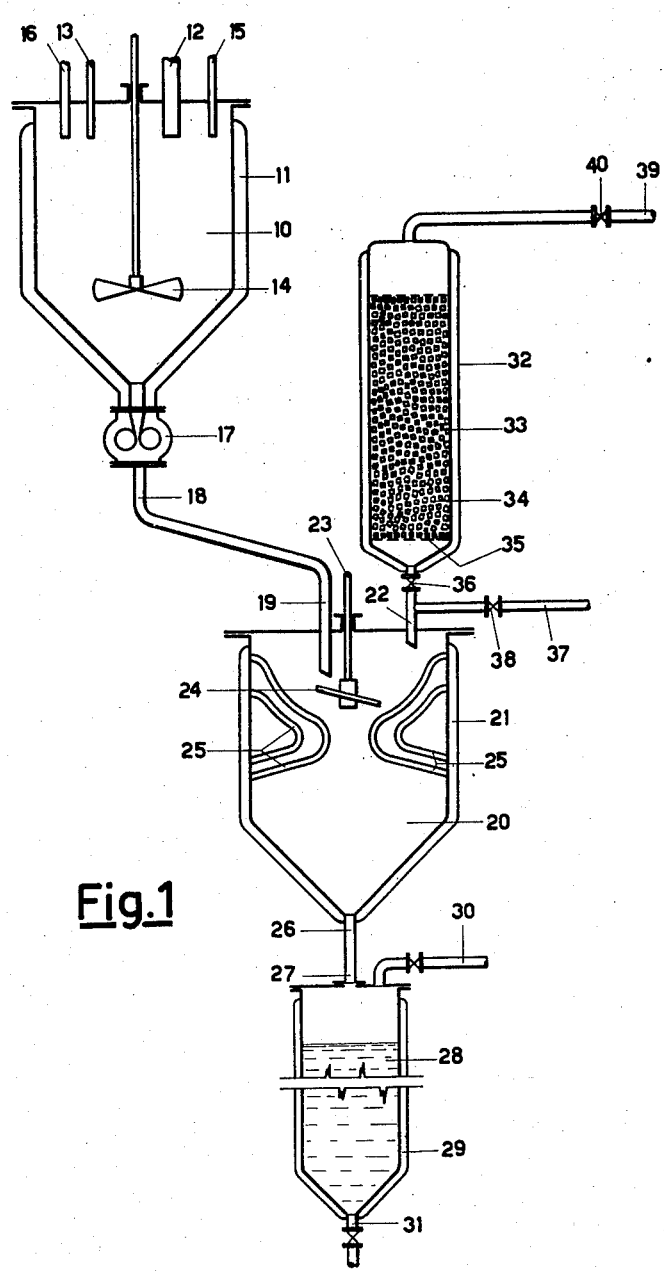

Oct. 13, 1959

L. NOTARBARTOLO 2,908,666

PROCESS FOR RECOVERING MONOMER FRACTIONS IN
THE CONDENSATION OF AMINO ACIDS AND
OTHER MONOMERIC PRODUCTS

Filed Dec. 18, 1956

2 Sheets-Sheet 1

INVENTOR.
L. Notarbartolo
BY
Glascock Downing Seebold
ATTYS.

United States Patent Office 2,908,666
Patented Oct. 13, 1959

2,908,666

PROCESS FOR RECOVERING MONOMER FRACTIONS IN THE CONDENSATION OF AMINO ACIDS AND OTHER MONOMERIC PRODUCTS

Luigi Notarbartolo, Milan, Italy, assignor, by mesne assignments, to Snia Viscosa Societa Nazionale Industria Applicazioni Viscosa S.p.A., Milan, Italy, an Italian company Application December 18, 1956, Serial No. 629,094

Claims priority, application Italy December 22, 1955

3 Claims. (Cl. 260—78)

There have been described processes for preparing synthetic linear polymers, in particular polyamides, from amide forming monomers, wherein the amino acid or other monomer is dissolved to form an aqueous solution or is suspended to form an aqueous suspension, which after adding stabilizers (and if needed opacifiers or other additional substances) is subjected to keen evaporation, preferably in a finely atomized form, so as to eliminate rapidly the water in the form of steam and to produce a polymer bath in the molten state, from which then polymerization or polycondensation is completed in known manner.

The processes of this kind, and generally speaking wherever an aqueous solution or suspension of amino acids or other amide-forming monomeric products is subjected to keen heating, the volume of steam that develops in rapid and continuous manner drags along with it aliquots of monomer in the form of fine powder or mist. In fact although in this operation there is formed a low polymer in the molten state, nevertheless in passing from the state of solution or suspension of the monomer to the state of low polymer, the monomer passes through the intermediate state of fine and dry powder or of mist and in that intermediate state, prior to melting and condensing, it is easily dragged along to sensible extent by the steam.

In the polycondensation of 11-aminoundecanoic acid, to which the present invention applies in a particularly advantageous manner and which in certain processes of condensation is subjected to keen heating in the state of aqueous solution or suspension, generally at 25–40% concentration, the percentages of monomer that are dragged along by the steam in the manner said above vary from 8 to 12% according to the speed of feeding, to the state of division (which may be by atomization) and to the concentration of the monomer solution or suspension as well as to the intensity and speed of of heating. The average loss in industrial production amounts to about 10%. One might think of recovering the monomer by cooling the vapours dragging it along and bringing them then into a cyclone to abate the monomer dust. Or one might think of cooling the steam with a water spray, or by bubbling it in water, and of filtering the aqueous suspension of monomer obtained in that way.

However experience has shown that the monomer that can be recovered in those ways as suggested by the art, is not utilizable for preparing a polymer if it is not previously purified and, therefore, it has to be subtracted to the operating cycle to be subjected to a costly additional teratment. The monomeric aminoundecanoic acid prepared industrially always contains small quantities of impurities obnoxious to the properties of the polymer. Said impurities are not accurately known as to their constitution, but they are likely to include residual oils originally contained in castor oil (from which aminoundecanoic acid is prepared), undecylenic acid and esters formed in the processing of the oil, as well as halogen derivatives of all those products, since the cycle of preparation of aminoundecanoic oil as is well-known comprises a halogenation, in general, by means of hydrobromic acid. However there may be present other impurities which are not known and in general it is impossible to determine accurately the chemical constitution of said impurities.

However a surprising and unexpected phenomenon has been found: almost all of the impurities originally contained in aminoundecanoic acid are concentrated in that fraction of acid that is dragged along by the steam in the evaporation of the solution or suspension, while the low polymer that is obtained is nearly pure. This constitutes one of the useful effects of the (above mentioned) processing which comprises as said a rapid evaporation of water from the solution or suspension of aminoundecanoic acid. As a consequence however the acid dragged along by the steam is impure to such a degree that it has not been considered economical so far to recover it and it was allowed to freely be dispersed in the atmosphere.

Now an industrial method has been found to recover direct in the pure state that monomer dragged along by the steam, or at least the major part thereof, and to recycle it without any purifying treatment. By the new method, the loss of monomer is reduced from 10% to 1–2% and, which is quite surprising, the impurities which from the monomer mass had passed with the 10% of monomer dragged along with the steam, remain in the 1–2% that is not recovered, while the remainder can return direct to polymerization.

Figure 2:
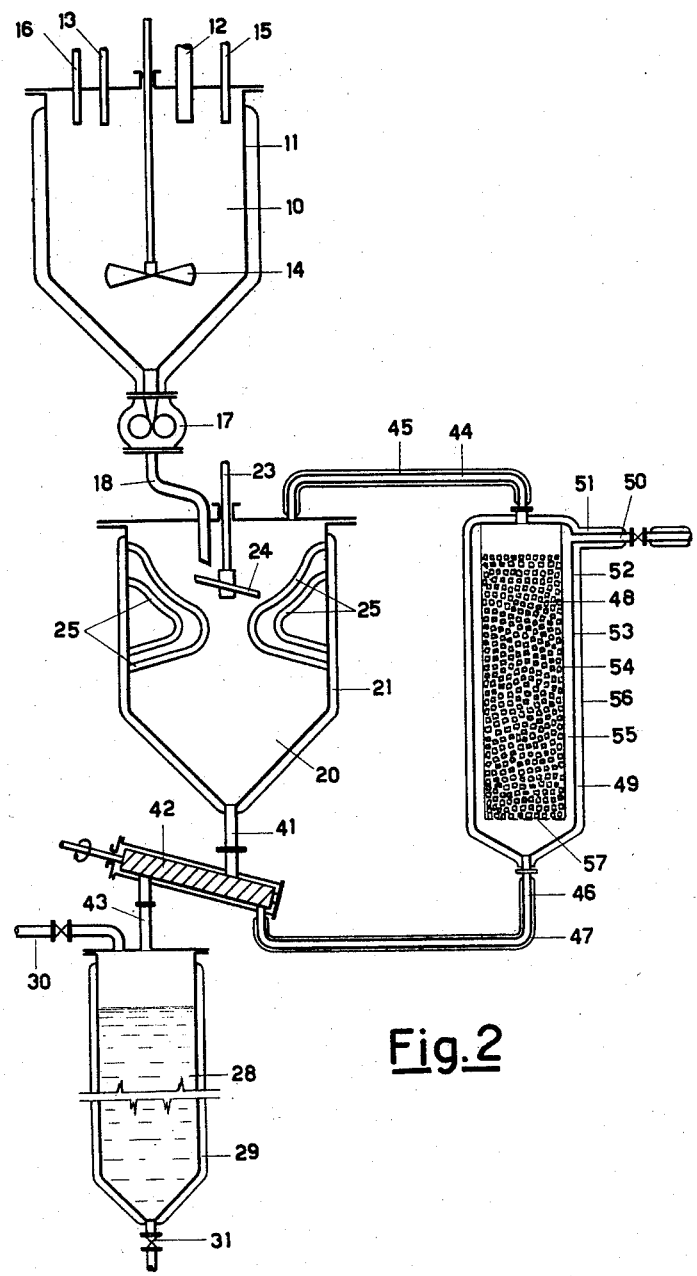

The invention will be better understood with reference to the accompanying drawing, wherein:

Figs. 1 and 2 represent diagrammatically two examples of embodiment of this invention.

With reference to Fig. 1, reference numeral 10 represents a mixing vessel provided with a double jacket 11 in which a suspension of aminoundecanoic acid is prepared. Into that vessel tbere is charged from aperture 12 a batch of monomer paste as it comes from the processing operation, namely containing 50–60% of acid and 50–40% of water as well as impurities. From the piping 13, water is introduced. Stirring is effected by the agitator 14. The addition of stabilizers and of pigments can take place in said vessel by means of the pipings 15 and 16; or it may be effected by taking out part of the suspension, adding the stabilizer and the opacifier thereto while stirring, and then bringing that part of suspension back into the vessel 10 and mixing it therein with the remainder. This way of preparing the suspension of acid is indicated merely by way of example, since it may be prepared even apart in whatsoever manner. Moreover, in lieu of a suspension, a solution may be prepared, while working at a temperature of 120–150° C. and, therefore, under pressure.

A pump 17 takes from the vessel 10 the suspension and conveys it into the piping 18 which opens into 19 in the upper part of an evaporator 20 provided with a double jacket 21. In the drawings there has been indicated a particular construction of evaporator, but it is by no means essential for the invention since the vessel 20 may have whatsoever structure and the invention would always apply, if from said vessel there develops a continuous and sufficiently keen stream of steam dragging monomer particles along with it. In the construction indicated by way of example, the evaporator carries in its upper portion a shaft 23 put to rapid rotation by means not illustrated, said shaft having at its lower end a dispersing member 24 constituted by way of example by an inclined plate whereonto the suspension jet impinges that comes from the orifice 19 under the pressure of the pump 17. The rotation of the disperser atomizes the liquid jet and projects the particles formed, against the heated bodies 25 conveniently arranged, which in the particular example illustrated are curved pipes arranged in a battery on the evaporator walls, within which a heating fluid circulates. In that way, a vigorous evaporation of the atomized suspension is attained and from the heated bodies there runs down to the bottom of the evaporator a fixed low polymer that passes from the discharge 26 through the piping 27 into the polymerizing pipe 28 of conventional construction and provided with a double heating jacket 29 and with vents 30. The fused polymer, having the desired degree of polymerization, is discharged from the aperture 31.

The evaporator 20 is provided with a vent 22, which is branched off at one side in the pipe 37 provided with a valve 38, and at the other side, through the valve 36, is in communication with the monomer regenerating unit indicated at 32 and which will now be described.

The regenerator 32 is constituted by a tower-shaped vessel empty inside. The vessel as well as its discharge valve and the piping 22 are provided with double heating jacket 33, or the heating is eliminated completely or partly, the regenerator or its non-heated parts being merely heat-insulated. The interior of the vessel 32 is filled with Raschig rings retained on the bottom by a gauze or grid 35 that does not prevent the steam and monomer from passing through, or other packing elements adapted to divide the stream of steam and to make it follow the tortuous path. The summit of the regenerator 32 is provided with a vent 39 with a closing valve 40.

From the above one sees that if the valve 38 is closed and the valves 36 and 40 are opened, the steam that develops in the evaporator 20 is compelled to pass entirely through the regenerator 32; while if the valves 36 and 40 are closed and the valve 38 is opened, the steam is vented freely into the atmosphere.

By means of the apparatus equipment hereinbefore described it is possible to prepare the polymer of aminoundecanoic acid in the following way. In the vessel 10, there are prepared 1500 kg. of a suspension of aminoundecanoic acid, with 33% acid concentration. A stabilizer is added, for instance ammonium stearate in proportion of 1.25% by weight with respect to the monomer. Then the temperature is brought up to 80° C. by heating. The whole is stirred. 25 kg. of aqueous solution of 20% $NH_3$ are added. Then if wanted titanium dioxide is added as an opacifier in a proportion of 0.3% by weight of $TiO_2$ with respect to the monomer, always stirring vigorously. The suspension so prepared passes to the evaporator 20 at a rate 60–70 kg./h. corresponding to about 20 kg./h. of dry aminoundecanoic acid, and is finely atomized in the manner described. The temperature of heated bodies keeps between 200° C. and 270° C., according to the quantity of product to be treated in the unit of time.

The projection of the finely atomized suspension onto said bodies causes therein conditions similar to explosion, a very rapid elimination of water, for the most part within few seconds' time. At the same time there takes place partial condensation of aminoundecanoic acid as already said. A low polymer is formed that drips down from the heated bodies 25 onto the bottom of the vessel 20 and passes to the polymerizing pipe, which is about 8 metres long, has an internal diameter of about 250–350 mm. and is kept at a temperature between about 220–270° C. The material in the polymerization stage employs about 24 hours or more to attain the discharge 31, from which it is obtained completely polymerized, with an intrinsic viscosity in metacresol of about 0.95–1.1.

At the same time, the steam developed in the evaporator 20, if the valve 38 is closed and the valves 36 and 40 are open, pass into the regenerator 32, at a rate of 40–50 kg./h. It transports about 2 kg./h. of aminoundecanoic acid in the shape of a very fine dust, corresponding to 10% of the aminoundecanoic acid that passes through the evaporator 20. The content of aminoundecanoic acid in the vapours can be determined by condensing the vapour in water and evaporating then the water.

The steam leaving the evaporator 20 is at 200–270° C. Hence it heats the Raschig rings to a temperature higher than the melting temperature of aminoundecanoic acid. On the Raschig rings a film of fused aminoundecanoic acid is formed, which flows along said rings downwards. Said film acts at the same time as an adhesive for the dust of aminoundecanoic acid transported by the steam, which is fixed thereby and also melts on the Raschig rings.

It should be clear that there is no contradiction or inconsistency between the fact that aminoundecanoic acid finds itself as a solid dust in the steam that may attain 270° C., while it melts on the Raschig rings which are merely heated by said steam. In fact one must bear in mind the extreme rapidity of evaporation of water in the evaporator 20 and of the formation of aminoundecanoic acid in dry dust or, better to say, in a mist. Owing to the rapidity of the phenomenon, the acid does not melt for the part that is transported away by the steam and that would be freely discharged into the atmosphere: on the contrary it melts in both the evaporator 20 and the regenerator 32, since it remains therein during a sufficient time at contact with surfaces at a temperature higher than its melting point.

The fused monomer returns through the piping 22 to the fuser and is thus recycled. The jacket 33 ensures that said monomer will not solidify at any point of its path.

The fused monomer which thus is recycled is pure like the low polymer that is obtained from the evaporator 20. Surprisingly and unexplainably the impurities remain almost entirely in the fraction of monomer that is not retained by the Raschig rings and that amounts to 0.2–0.4 kg./h. This monomer leaves the vent 39 for the atmosphere and can, if needed, be recovered by ordinary means and be subjected to purification, prior to being re-utilized.

Fig. 2 illustrates another example of embodiment of the invention.

The vessel 10 for forming the suspension, the evaporator 20 and the polymerizer 28 with all their parts connected thereto, are identical to those of the preceding example of embodiment. In this case however the low polymer that forms in the evaporator 20 does not fall by gravity into the polymerizer 28 but passes on the contrary through a discharge 41 into a screw conveyor 42 which carries it into the charging pipe 43 for the polymerizer 28. On the other hand, the regenerator indicated with reference numeral 52 is constituted by a cylindrical inner jacket 54 packed with Raschig rings 48 and by an external jacket 56 which defines with the preceding one an interspace 53. The interior of the jacket 54 is connected at its upper part by means of a pipe 44 provided with a double heating jacket 45, with the summit of the evaporator 20, and in its lower part it is open and provided with a gauze or grid 57 for retaining the Raschig rings while allowing passage of the steam and of the fused monomer. The interspace 53, instead, is in communication at bottom, by means of a piping 46 provided with a double jacket 47, with the charging zone for the screw 42, and towards its top with a discharge 50 provided with a double jacket 51.

Operation is completely analogous to that in the preceding case and the amounts of material that flow through the apparatus equipment may be the same as in the preceding case. The difference lies in that the steam transporting the monomer passes through the pipe 44 into the internal jacket 54 of the regenerator 52, through the interior of said jacket, passing between the Raschig rings and rises again through the interspace 53 to leave from the discharge 50. At the same time, the recovered monomer drips from the interior of the jacket 54, passes through the gauze or grate 57 and then to the pipe 46 from which it reaches the screw 42 which conveys it, not to the fuser as in the preceding case, but direct to the polymerizing apparatus.

In a further example of embodiment of the invention, the apparatus equipment of Fig. 1 again is utilized for the treatment of another monomer forming amides namely of hexamethylene diammonium adipate. 1,500 kg. of a 40% solution of hexamethylene diammonium adipate, stabilized with stearic acid in a proportion of 0.1% of the monomer, are prepared in the vessel 10. The evaporator 20 is fed with 50 kg./h. of the solution. The evaporator itself and the heated bodies 25 are kept at a temperature of 290° C. Here too the rapid evaporation of the solution water takes place and from the bottom there is recovered a low polymer of hexamethylene diammonium adipate, in fused condition, which can pass directly into the polymerization apparatus 28 or can be conveyed into another polymerization apparatus with continuous or batch operation and of whatsoever conventional construction. At any rate, if the valve 36 is kept closed and, instead, the valve 37 is kept open, the steam that evolves from the evaporator 20 and is dispersed, carries about 2.5 kg./h. of salt (hexamethylene diammonium adipate). If on the contrary the valve 37 is kept closed and the valves 36 and 40 are kept open, that is, if the steam is made to pass through the regenerator 34, this acts in the same way in which it acted when the monomer was aminoundecanoic acid and all of the salt contained in the steam is recovered, except about 0.3 kg./h. which remain in the steam.

The same treatment might be effected with the apparatus equipment of Fig. 2, leaving unvaried the quantities of hexamethylene diammonium adipate and all the other variables of the process.

Of course the invention is not limited to the examples of embodiment described, since it can be carried out in various manners. In particular it is not limited to the shape of the evaporator 20 nor to its structure nor to the particular connections and relationships of position between said evaporator and the regenerator. It is not even limited to the particular monomers described and not even in general to the monomers from which polyamides are obtained, but it is applicable to all those monomers which in the rapid evaporation of their solution or suspensions are partly carried along, in the shape of dry dust or of mist, by the vapour of the solvent or liquid of the suspension.

I claim:

1. A process of forming a high polymer from the monomer 11-aminoundecanoic acid containing impurities comprising mixing said monomer with a major amount of water, injecting the resultant mixture which is below the melting point of the monomer and in which the water is in liquid state in the form of a jet into an evaporator containing internally heated bodies maintained at a temperature above the melting point of the monomer and above the boiling point of water and abruptly changing the direction of the jet and applying centrifugal forces thereby atomizing and throwing it against the heated bodies causing formation of low polymers and rapid evolution of steam, passing evolved steam, entrained monomer and evolved impurities from the evaporator into a packed zone maintained above the melting point of the monomer and trapping the monomer in said zone, permitting purified monomer to flow back to the evaporator while venting steam and other material not trapped in the tower and flowing the low polymer and purified monomer from the evaporator into a tube wherein they are polymerized to a high polymer.

2. The process of claim 1, wherein the monomer is stabilized with ammonium stearate.

3. The process of claim 2, wherein aqueous ammonia is added to the mixture.

References Cited in the file of this patent

UNITED STATES PATENTS

| 2,731,081 | Mayner | Jan. 17, 1956 |
| 2,735,839 | Schrenk | Feb. 21, 1956 |

FOREIGN PATENTS

| 994,244 | France | Aug. 3, 1951 |
| 526,488 | Belgium | Feb. 27, 1953 |

OTHER REFERENCES

Perry Chemical Engineers' Handbook, 1950, pages 618, 619, 685. (Copy in Science Library.)